Feb. 10, 1970　　　D. M. SOIGNET ET AL　　　3,494,719
FORMATION OF DIQUATERNARY SALT LINKAGES BETWEEN TWO
CELLULOSE UNITS BY REACTING DIETHYLAMINOETHYLATED
COTTON WITH EPICHLOROHYDRIN
Filed June 16, 1967
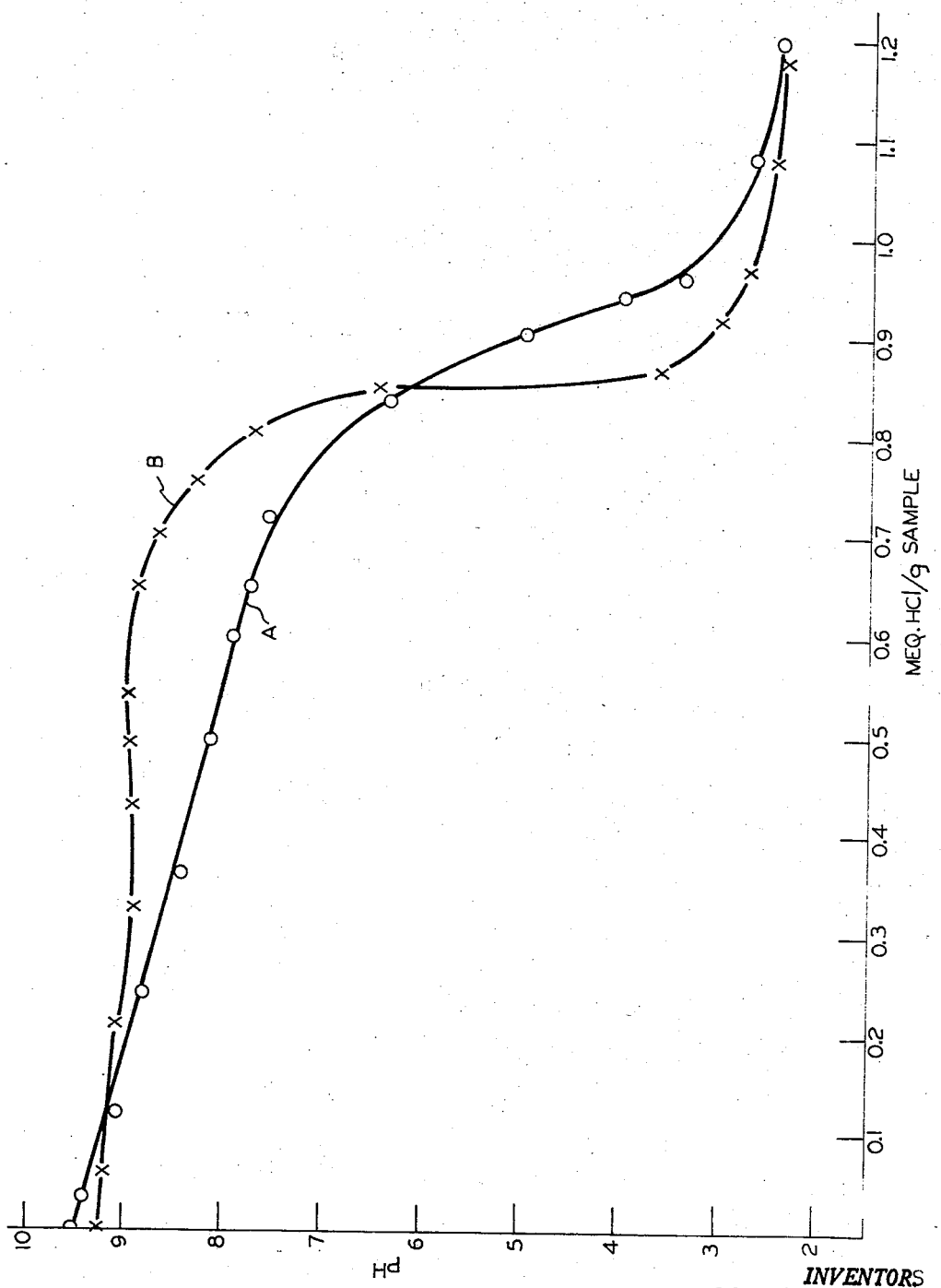
*INVENTORS*
DONALD M. SOIGNET
RUTH R. BENERITO
RALPH J. BERNI
ATTORNEYS

United States Patent Office 3,494,719
Patented Feb. 10, 1970

3,494,719
FORMATION OF DIQUATERNARY SALT LINKAGES BETWEEN TWO CELLULOSE UNITS BY REACTING DIETHYLAMINOETHYLATED COTTON WITH EPICHLOROHYDRIN
Donald M. Soignet, Metairie, and Ruth R. Benerito and Ralph J. Berni, New Orleans, La., assignors to the United States of America as represented by the Secretary of Agriculture
Filed June 16, 1967, Ser. No. 646,739
Int. Cl. D06m *13/08*
U.S. Cl. 8—116                                    1 Claim

ABSTRACT OF THE DISCLOSURE

This invention relates to the production of partial cellulose ethers with improved resiliency and strong anion exchange properties. More particularly, this invention relates to the reaction of diethylaminoethylated cotton and epichlorohydrin to produce a cellulose ether with strong anion exchange properties and improved wet and dry crease resistance.

A non-exclusive, irrevocable, royalty-free license in the invention herein described throughout the world for all purposes of the United States Government, with the power to grant sublicenses for such purposes, is hereby granted to the Government of the United States of America.

A primary object of the present invention is to provide a method for preparing at will some cellulose ethers with strong anion exchange properties and improved wet and dry crease recovery.

Prior art processes are known for the preparation of diethylaminoethylated cotton. The method of Hartman (Hartman, M., U.S. Patent 1,777,970, Oct. 7, 1930) produced a fabric that possessed weak anion exchange properties and showed no increase in dry recovery angle. Hoffpauir and Guthrie (Hoffpauir, C. L., and Guthrie, J. D., Textile Research Journal 20, 617 (1950)) converted some of the tertiary amino groups to quaternary groups by refluxing with a 10% CH$_3$I solution in absolute ethanol. Benerito (Benerito, R. R., Woodward, B. B., and Guthrie,

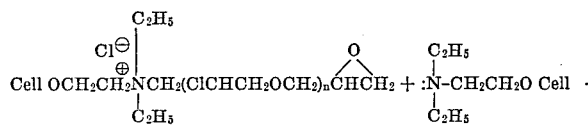

J. D., Analytical Chemistry, 37, 1693 (1965)) found that a larger number of these tertiary amino groups could be converted to quaternary groups using the method of Hoffpauir and Guthrie while treating the fabrics under anhydrous conditions. It is also known that treating a fabric with a compound that contains a quaternary amino group and some other active substituent yields a fabric with strong anion exchange properties but with only a slight increase in wet recovery and a decrease in dry recovery and a decrease in dry recovery. It has also been shown that epichlorohydrin will add to cellulose if the cellulose has been pretreated with NaOH (McKelvey, J. B., Benerito, R. R., Bernie, R. J., and Burgis, B. G., Journal of Applied Polymer Science, 7, 1371 (1963)). Attempts to react epichlorohydrin with fabrics that were not pretreated have been unsuccessful.

In contrast to the prior art, this invention relates to the formation of quaternary amino groups on cellulose without necessitating the use of NaOH as a catalyst or the maintaining of anhydrous conditions. Also, this invention produces a fabric that possesses strong anion exchange properties and increases in wet and dry crease recovery.

Epichlorohydrin is capable of reacting with a tertiary amine hydrohydroxide. This reaction removes the H$^\oplus$ and the OH$^\ominus$ from the tertiary amine hydrohydroxide to form the free amine. The free amine can react with another mole of epichlorohydrin to form the quaternary salt which in turn reacts with additional epichlorohydrin to form a polymeric substance containing a terminal epoxide group. This polymeric specie can then react with another tertiary amine to form a diquaternary salt linking two cellulose units together. The following equations show the probable course of this reaction.

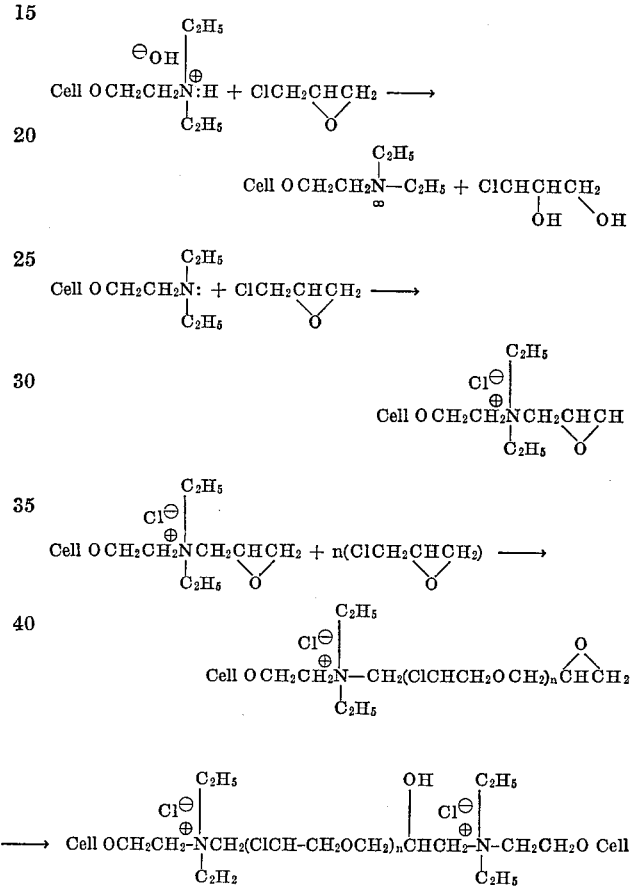

In the present invention, a cotton fabric is pretreated with a 10% aqueous solution of β-chloroethyldiethylamine hydrochloride. The treated fabric is then dried and immersed overnight in a 25% aqueous solution of NaOH. The fabric is washed in dilute acetic acid to remove NaOH, dried and immersed in pure-epichlorohydrin, which had been preheated to and maintained at 95° C. for 3 hours. The sample is then washed in absolute methanol, tap water and finally distilled water. The fabric is then ironed dry and equalibrated.

To determine the ion exchange, an accurately weighed sample of sufficient weight to give approximately 0.8 meq. of replaceable anion was placed in a titration flask containing exactly 50.00 ml. of a salt solution prepared with conductivity water and kept in a nitrogen atmosphere. The sample was allowed to equilibrate overnight in the titration flask while being stirred with nitrogen gas bubbled first into a bubbler containing the given solution before being bubbled into the titration flask to minimize concentration changes in the flask. All potentiometric titrations were carried out in specially designed cells of approximately 250 ml. capacity having four ground glass outlets to accommodate the microburet in the center, an inlet-outlet tube for nitrogen, the glass electrode and the saturated calomel electrode. All pH measurements were made with a Beckman Model G–S pH meter to a ±0.05 pH units. Each titration required from 8–12 hours because of time required in some instances for establishment of equilibrium. FIGURE I illustrates the curves (A) of strong and weak (B) ion exchange cotton.

EXAMPLE 1

Approximately 10 g. of an 80 x 80 printcloth, desized, scoured, and bleached was impregnated in a 10% solution of β-chloroethyldiethylamine hydrochloride for ten minutes. The fabric was dried in an air oven at 60° C. The fabric was then immersed in a 25% aqueous solution of NaOH for a period of 16 hours. The treated fabric, diethylaminoethylated cellulose, was washed in dilute acetic acid, tap water, ironed dry and equilibrated. The nitrogen content of the treated fabric was determined and the above sequence of operations was repeated until a nitrogen content of at least 0.7% was obtained.

EXAMPLE 2

Approximately 9 g. of diethylaminoethylated cotton, prepared as in Example 1 and having a nitrogen content of 0.71% and a wet and dry crease recovery of 213 and 214 (W+F) degrees, was placed in a 100 ml. graduated cylinder containing excess reagent grade epichlorohydrin, preheated to and maintained at 95° C. for three hours. After the reaction period, the fabric was washed in absolute methanol followed by washing with tap water and distilled water. The fabric was ironed dry and equilibrated and had a weight gain of 9.2% and a wet and dry crease recovery of 265 and 284 (W+F) degrees. The fabric was titrated as a strong base anion exchange resin.

EXAMPLE 3

Approximately 8 g. of diethylaminoethylated cotton with a nitrogen content of 0.27% and a wet and dry crease recovery of 216 and 194 (W+F) degrees was treated as in Example 2. The resulting product had a 5.1% weight gain and a wet and dry crease recovery of 262 and 229 (W+F) degrees. The fabric was titrated as a strong base anion exchange resin.

EXAMPLE 4

Approximately 8 g. of diethylaminoethylated cotton with a nitrogen content of 1.23% and a wet and dry crease recovery of 196 and 196 (W+F) degrees was treated as in Example 2. The resulting product had a weight gain of 15.2% and a wet and dry crease recovery of 243 and 288 (W+F) degrees. The fabric was titrated as a strong base anion exchange resin.

EXAMPLE 5

Approximately 10 g. of an 80 x 80 printcloth, designed, scoured and bleached was impregnated in a 10% solution of β-chloroethyldiethylamine hydrochloride for ten minutes. The fabric was dried in an air oven at 60° C. The fabric was then immersed in a 25% aqueous solution of NaOH for 16 hours. The treated fabric, diethylaminoethylated cellulose, was washed in dilute acetic acid, tap water, and dried over $P_2O_5$ for 48 hours. The above sequence of operations was repeated until the fabric had a nitrogen content of 1.23% and a wet and dry crease recovery of 196 and 196 (W+F) degrees.

Approximately 8 g. of the above diethylaminoethylated cotton was immersed in excess reagent grade epichlorohydrin, preheated to and maintained at 95° C. for three hours. After the reaction period, the fabric was washed in absolute methanol followed by washings with tap water and distilled water. The fabric was ironed dry and equilibrated and had a wet and dry crease recovery of 233 and 293 (W+F) degrees. The fabric was titrated as a strong base anion exchange resin.

We claim:
1. A process for producing partial cellulose ethers in fabric from which process comprises the following steps:
    (a) reacting diethylaminoethylated cotton with a nitrogen content of at least 0.7% with pure epichlorohydrin, preheated to and maintained at 95° C. for a period of about three hours,
    (b) washing the fabric free of reagents, drying, and equilibrating the washed fabric.

References Cited

UNITED STATES PATENTS

| | | | |
|---|---|---|---|
| 2,898,310 | 8/1959 | Greer | 260—2.1 |
| 3,277,025 | 10/1966 | Flodin et al. | 260—2.1 |

OTHER REFERENCES

Hoffpauir et al., Textile Research Journal, vol. 20, pp. 617–620 (1950).

Benerito et al., Analytical Chemistry, vol. 37, pp. 1693–1699 (1965).

GEORGE F. LESMES, Primary Examiner

J. CANNON, Assistant Examiner

U.S. Cl. X.R.

8—120; 260—2.1, 231, 232